Figure 1:
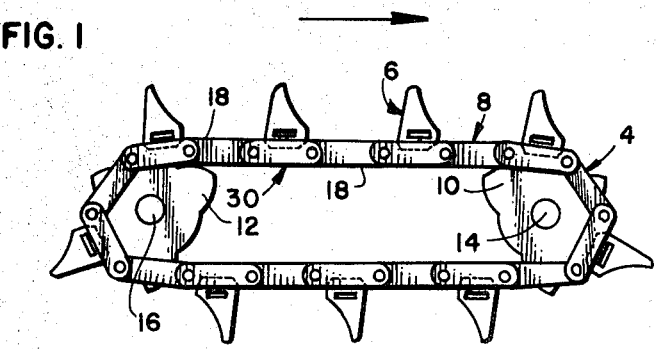

United States Patent

[11] 3,559,796

| [72] | Inventors | Charles F. Marks<br>Indianapolis, Ind.;<br>Richard F. Werking, Arlington Heights,<br>Ill.; Baird E. Resener, Indianapolis, Ind. |
|---|---|---|
| [21] | Appl. No. | 749,060 |
| [22] | Filed | July 31, 1968 |
| [45] | Patented | Feb. 2, 1971 |
| [73] | Assignee | AMSTED Industries Incorporated<br>Chicago, Ill.<br>a corporation of Delaware |

[54] ATTACHMENT FOR LINK CHAINS
2 Claims, 3 Drawing Figs.

| [52] | U.S. Cl. | 198/173,<br>198/175, 198/198 |
|---|---|---|
| [51] | Int. Cl. | B65g 19/22 |
| [50] | Field of Search | 198/198,<br>199, 200, 173, 174, 175, 176 |

[56] References Cited
UNITED STATES PATENTS

| 3,091,325 | 5/1963 | Klemme | 198/174 |
| 2,571,811 | 10/1951 | Andrews | 198/C.M.(UX) |
| 2,865,492 | 12/1958 | Bigler et al. | 198/176 |
| 2,923,304 | 2/1960 | Vitense et al. | 198/174 |
| 3,197,040 | 7/1965 | Chapman | 198/174 |
| 3,246,731 | 4/1966 | I'Anson | 198/176 |

OTHER REFERENCES

Chain Belt Company Publication (Bulletins 57-11 and 57-12) 6 pages. Date: 2/19/59. Title: "Plate for Roller Chain with Snap-on Plates of Nylon.

*Primary Examiner*—Evon C. Blunk
*Assistant Examiner*—Roger S. Gaither
*Attorney*—Walter L. Schlegel, Jr.

ABSTRACT: A mounting link plate for a link chain has a laterally projecting bridge secured to one of its longitudinal edges. The bridge is press-fit into a slot in a nonmetallic lug. The link and lug are then pivotally secured to a chain by pins and a pin link plate in a known manner so that the lug is located between the spaced connected link plates and projects away from the chain.

PATENTED FEB 2 1971   3,559,796

INVENTORS.
CHARLES F. MARKS
RICHARD F. WERKING
BAIRD E. RESENER
BY Walter L. Schlegel, Jr.
ATT'Y

ATTACHMENT FOR LINK CHAINS

This invention relates generally to conveyor means and more particularly to material handling attachments for link-type chains.

It is common practice in agricultural and material handling applications to add various attachments to a link-type chain for the purpose of carrying, pushing, or aligning movable objects. Normally, these attachments are made of metal and are integral with a pair of link plates that are attachable to the chain in a known manner. The cost of constructing these integral attachments if often prohibitive. Furthermore, when the attachment wears, both it and its integral link plates must be replaced resulting in unnecessary expense. Fabricating intricate shapes is also very difficult since the link plates must be accurately spaced and constructed for maximum wear thereby economically limiting the amount of metal forming that may be done on the given attachment. It is, therefore, an object of this invention to provide an inexpensive means for mounting lugs of various shapes and sizes to a link type chain.

It is a further object of this invention to provide a lug that may be inexpensively constructed in a variety of shapes and sizes and easily and quickly secured to a material handling conveyor.

Figure 2:
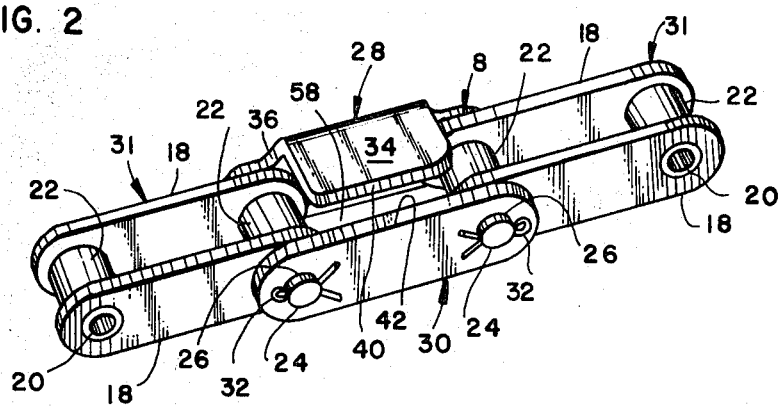
Figure 3:
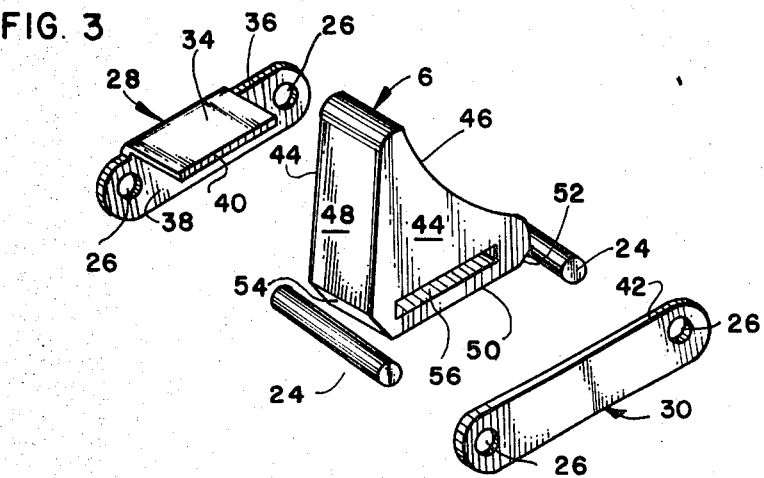

The foregoing and other objects and advantages of the invention will become apparent from the following description and accompanying drawings, wherein:

FIG. 1 is a side elevational view of an endless material handling conveyor embodying features of this invention;

FIG. 2 is a persepective view illustrating a mounting link secured to a section of a roller chain; and FIG. 3 is an exploded view illustrating the assembly of a mounting link, a lug, a pin link, and pins. Describing the invention in detail and referring to the drawings, FIG. 1 illustrates a material handling conveyor, generally designated 4, having lugs 6 mounted on a roller type chain 8 which is trained upon sprockets 10 and 12. These sprockets 10 and 12 are carried on shafts 14 and 16 whose axes are normal to the general plane of the conveyor 4.

A section of the chain 8 is illustrated as a roller chain in FIG. 2 having spaced, corresponding roller link plates 18 rigidly interconnected at their end by bushings 20. Intermediate each pair of connected roller links 18 are rollers 22 rotatably mounted on the bushings 20. Pins 24 projecting through aligned holes 26 in the ends of a mounting link plate 28 and a pin link plate 30 and though the bushings 20, pivotally connect the links 28 and 30 to adjacent roller link assemblies 31. The pins 24 may be retained to the links 28 and 30 in any known manner, such as by cotter pins 32.

A mounting link 28 is illustrated in FIGS. 2 and 3 as a relatively thin bar having an integral lateral arm or bridge 34 projecting from a longitudinal edge 36. The bridge 34 projects perpendicularly outwardly from the link's side 38. The bridge 34 and the pin link plate 30 are constructed so that the end 40 of the bridge 34 terminates intermediate the connected links 28 and 30 and above the upper longitudinal edge 42 of the pin link 30. If desired, the link 30 may be designed to extend above the end 40 of the bridge 34 thereby acting as a retaining means for a lug 6.

The lug 6 is illustrated in FIG. 3 as having sides 44 a curved front 46, an angular back 48, and a base 50. Beveled surfaces 52 and 54 respectively, interconnect the 50 to the front 46 and back 48. An aperture 56 extends through the lug 6 and is engageable with the bridge 34 of the mounting link 28 in a press-fit relationship. The bridge 34 and aperture 56 may be of any given mateable shape. The lug 6 may also be of any given shape or size.

In general use the link plates 18, 28 and 30 are made of metal, e.g., steel. The lug 6 is preferably made out of a nonmetallic material that may be easily molded. In this respect thermoplastic or thermosetting plastics can be used for the lug as well as elastomeric materials such as rubber or polyurethane. The given material for a lug 6 is chosen on the basis of the parameters involved, e.g., shape, wear resistance, noise control, corrosion resistance, hardness and resiliency.

In assembly, a lug 6 is press fit onto a bridge 34 of a mounting link 28. The mounting link 28 and a pin link 30 are then pivotally connected to the ends of the roller link assemblies 31 as previously noted and shown in FIGS. 2 and 3. The mounting links 28 may be secured to a chain 8 at any given location, e.g., every other link may be a mounting link as shown in FIG. 1. The lug 6 as illustrated is designed to fit within the space 58 between the connected links 28 and 30. The bevels 52 and 54 are provided on the ends of the lug 6 to allow clearance between the lug and the ends of the roller links 18 and rollers 22. The base 50 of the lug 6 extends below the edges 36 and 42 of the links 28 and 30 thereby limiting lateral movement of the lug. The teeth on sprockets 10 and 12 may project between the roller links 18 or between every pair of links depending upon the design of the teeth, bridge, and lug. The mounting link may be secured to pin links, roller links or both, depending on the given use of the conveyor.

It should be noted that two mounting links 28 could also be used to secure each lug 6. In this instance the bridges 34 of the opposed links 28 would project toward each other and part way into the aperture 56 of the lug 6. This double connection has the added advantage of distributing the force exerted on the lug 6 equally to both sides of the chain 8.

It is to be understood that the foregoing description and the accompanying drawing have been given only by way of illustration and example. It is also to be understood that changes in form of the elements, rearrangement of parts, and substitution of equivalent elements, which will be obvious to those skilled in the art, are contemplated as within the scope of the present invention which is limited only by the following claims.

We claim:

1. An attachment for a link chain having a plurality of laterally spaced link plates pivotally interconnected at their ends to other laterally spaced link plates, said attachment comprising:

a retaining link plate pivotally connected at its ends to certain of said laterally spaced link plates of said link chain:

a mounting link plate pivotally connected at its ends to said retaining link plate and to said certain of said laterally spaced link plates of said link chain, said mounting link plate being laterally spaced from said retaining link plate;

an arm on said mounting link plate projecting upwardly above an upper edge of said link chain and laterally toward said retaining link plate;

inwardly facing surfaces on said mounting link plate and said retaining link plate, respectively, partially defining a space between said mounting link plate and said retaining link plate;

a lug in said space between said mounting link plate and said retaining link plate, said lug projecting upwardly above said upper edge of said link chain and having an aperture extending laterally therethrough, said arm on said mounting link plate being movably engaged in said aperture, whereby, the arm on said mounting link plate and the lug are moveable relative to each other for disassembly; and outwardly facing side surfaces on said lug engageable, respectively, with said inwardly facing surfaces of said mounting link plate and said retaining link plate to retain said lug between said mounting link plate and said retaining link plate.

2. The attachment set out in claim 1, including an arm on said retaining link plate projecting upwardly above said upper edge of said link chain and laterally toward said mounting link plate, said arm on said retaining link plate being movably engaged in said aperture in said lug, whereby, the arm on said retaining link plate and the lug are movable relative to each other for disassembly.